US009777575B2

(12) United States Patent
Tapia et al.

(10) Patent No.: US 9,777,575 B2
(45) Date of Patent: Oct. 3, 2017

(54) TURBINE ROTOR ASSEMBLIES WITH IMPROVED SLOT CAVITIES

(71) Applicant: HONEYWELL INTERNATIONAL INC., Morristown, NJ (US)

(72) Inventors: Luis Tapia, Maricopa, AZ (US); Steve Halfmann, Chandler, AZ (US); Stuart Andrew Harman, Sun City, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 957 days.

(21) Appl. No.: 14/159,043

(22) Filed: Jan. 20, 2014

(65) Prior Publication Data
US 2015/0204194 A1    Jul. 23, 2015

(51) Int. Cl.
| F01D 5/04 | (2006.01) |
| F01D 5/08 | (2006.01) |
| F01D 5/18 | (2006.01) |
| F01D 5/30 | (2006.01) |

(52) U.S. Cl.
CPC .............. *F01D 5/04* (2013.01); *F01D 5/081* (2013.01); *F01D 5/18* (2013.01); *F01D 5/3007* (2013.01); F05D 2230/60 (2013.01); Y02T 50/676 (2013.01); Y10T 29/49321 (2015.01)

(58) Field of Classification Search
CPC .......... F01D 5/04; F01D 5/081; F01D 5/3007; F01D 5/18
USPC ..... 416/97 R, 193 A, 219 R, 220 R, 221, 95, 416/96 R, 96 A
See application file for complete search history.

(56) References Cited

U.S. PATENT DOCUMENTS

| 2,848,193 | A |   | 8/1958 | Sells et al. | |
| 2,920,865 | A | * | 1/1960 | Lombard | B64C 1/40 416/193 A |
| 3,192,578 | A |   | 7/1965 | McCormick | |
| 3,791,758 | A | * | 2/1974 | Jenkinson | F01D 5/081 415/116 |
| 4,451,205 | A | * | 5/1984 | Honda | F01D 5/22 416/193 A |
| 4,820,126 | A |   | 4/1989 | Gavilan | |
| RE33,954 | E | * | 6/1992 | Honda | F01D 5/3007 416/196 R |

(Continued)

FOREIGN PATENT DOCUMENTS

| EP | 0043300 A2 | 1/1982 |
| EP | 1041246 A1 | 10/2000 |

(Continued)

OTHER PUBLICATIONS

EP Extended Search Report for Application No. 15151181.3, Dated May 20, 2015.

(Continued)

*Primary Examiner* — Jesse Bogue
*Assistant Examiner* — Jason T Newton
(74) *Attorney, Agent, or Firm* — Lorenz & Kopf, LLP

(57) ABSTRACT

The turbine rotor blade includes a platform with a first side and a second side; an airfoil extending from the first side of the platform; and an attachment portion extending from the second side of the platform. The attachment portion includes first and second side surfaces and a base surface on an underside of the attachment portion between the first and second side surface. The base surface includes at least one curved segment or angled segment.

13 Claims, 17 Drawing Sheets

(56) References Cited

U.S. PATENT DOCUMENTS

| | | | |
|---|---|---|---|
| 5,403,156 A | 4/1995 | Arness et al. | |
| 6,786,696 B2 | 9/2004 | Herman et al. | |
| 8,622,702 B1* | 1/2014 | Liang | F01D 5/18 416/96 R |
| 8,939,711 B2* | 1/2015 | Lee | F01D 11/001 415/116 |
| 2006/0275125 A1* | 12/2006 | Bibor | F01D 5/3007 416/193 A |

FOREIGN PATENT DOCUMENTS

| | | |
|---|---|---|
| EP | 1365108 A2 | 11/2003 |
| EP | 2090751 A1 | 8/2009 |
| GB | 741508 | 12/1955 |
| GB | 853586 | 11/1960 |
| GB | 1012899 | 12/1965 |
| JP | 59108805 A | 6/1984 |
| JP | 2011-021543 | 2/2011 |
| WO | 0171166 A1 | 9/2001 |

OTHER PUBLICATIONS

Reyhani M., et al.; Turbine blade temperature calculation and life estimation—a sensitivity analysis; Propulsion and Power Research 2013:2(20):148-161.

* cited by examiner

TURBINE ROTOR ASSEMBLIES WITH IMPROVED SLOT CAVITIES

TECHNICAL FIELD

The inventive subject matter generally relates to turbine rotor assemblies, and more particularly relates to cooling the turbine rotor blades of the turbine rotor assemblies.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. Operating temperatures may be, for example, 1100° C. As such, it is desirable to cool the rotor blades and stator vanes to prevent or reduce adverse impact and extend useful life. Mechanisms for cooling turbine rotor blades include ducting cooling air through internal passages and then venting the cooling air through holes formed in the airfoil. Internal and film cooling techniques attempt to maintain temperatures that are suitable for material and stress level. However, despite these advances, cooling remains a challenge, particularly considering the pressure and flow losses that may occur as cooling air is directed to the areas that require cooling.

Accordingly, it is desirable to have turbine rotor assemblies with an improved manner for cooling while maintaining or improving engine efficiency. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In accordance with an exemplary embodiment, a turbine rotor blade includes a platform with a first side and a second side; an airfoil extending from the first side of the platform; and an attachment portion extending from the second side of the platform. The attachment portion includes first and second side surfaces and a base surface on an underside of the attachment portion between the first and second side surface. The base surface includes at least one curved segment or angled segment.

In accordance with another exemplary embodiment, a turbine rotor assembly for a turbine section of an engine includes a rotor disk with a plurality of slots formed about a periphery of the rotor disk and a first turbine rotor blade. A first slot of the plurality of slots includes a slot bottom and slot side walls. The first turbine rotor blade includes a platform with a first side and a second side; an airfoil extending from the first side of the platform; and an attachment portion extending from the second side of the platform and arranged within the first slot of the rotor disk. The attachment portion includes first and second side surfaces and a base surface. The attachment portion includes feed inlets defined in the base surface for receiving cooling air. The base surface and the slot bottom define a slot cavity with a slot inlet, the slot cavity configured to receive the cooling air through the slot inlet and direct the cooling air into the feed inlets. The slot cavity has a cross-sectional area that decreases along a generally axial direction.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Exemplary embodiments discussed herein are directed to turbine rotor assemblies capable of providing improved cooling performance and/or efficiency. Generally, the improved turbine rotor assemblies include a turbine rotor blade with an attachment portion having a base surface forming a slot cavity with a slot bottom of a turbine rotor disk. Cooling air is directed into and through the slot cavity to feed inlets in the base surface. The feed inlets direct the cooling air through internal passages to various portions of the turbine rotor blade. In the exemplary embodiments discussed below, the base surface of the attachment portion is oriented such that the cross-sectional area of the slot cavity decreases along the axial length. The decreasing cross-sectional area may function to improve flow characteristics of the cooling air through the slot cavity and into the feed inlets.

Figure 1:
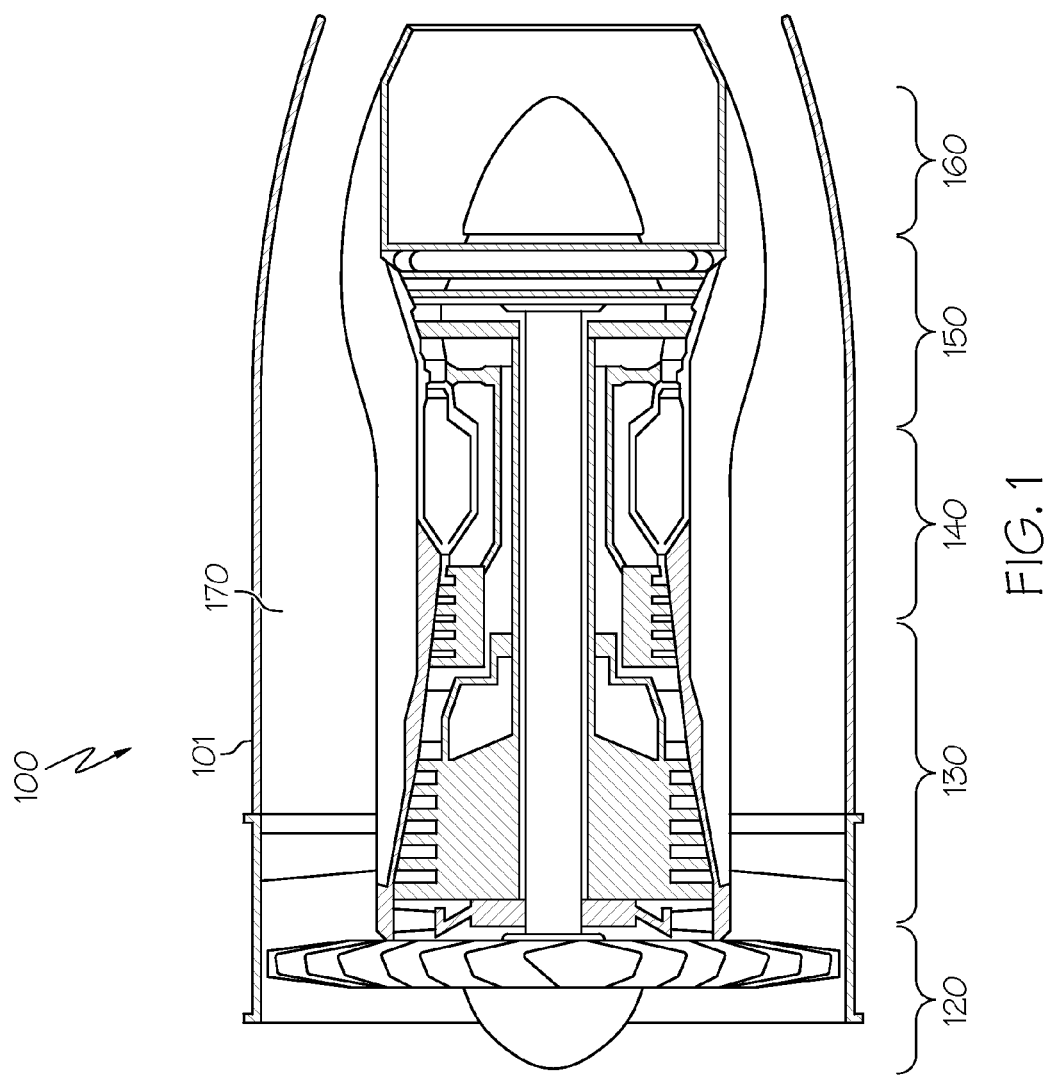
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
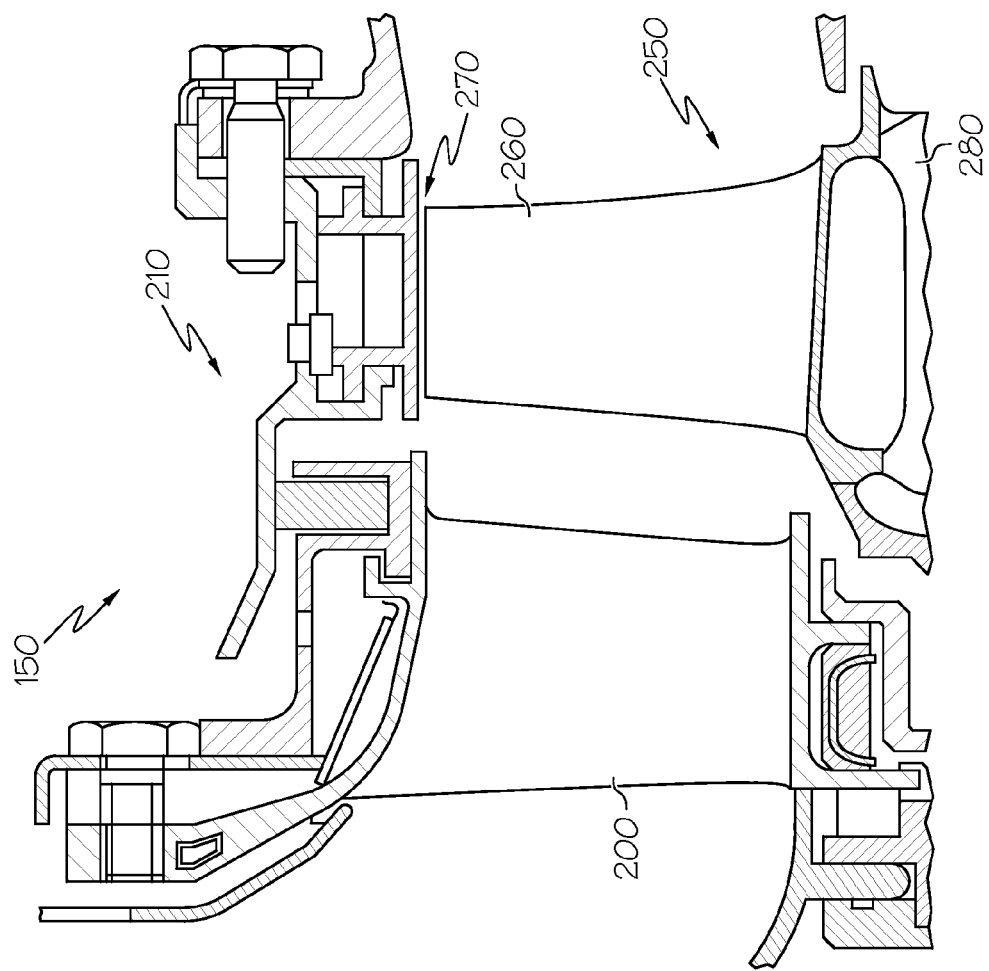
FIG. 2 is a partial, sectional elevation view of a portion of a turbine section of the gas turbine engine of FIG. 1 in accordance with an exemplary embodiment.

FIG. 2 is a partial, cross-sectional side view of a turbine section of an engine, such as the turbine section 150 of the gas turbine engine 100 of FIG. 1 in accordance with an exemplary embodiment. The turbine section 150 includes a turbine stator assembly 200 and a turbine rotor assembly 250 surrounded by a shroud 210 defining a gas flow path through which hot, combusted air from an upstream compressor section (e.g. compressor section 130 of FIG. 1) is directed. Although only one turbine stator assembly 200 and one turbine rotor assembly 250 are shown, such stator assemblies 200 and rotor assemblies 250 are typically arranged in alternating axially spaced, circumferential rows. As used herein, the term "axial" refers to a direction generally parallel to the engine centerline, while the term "radial" refers to a direction generally perpendicular to the engine centerline.

The rotor assembly 250 generally includes rotor blades 260 (one of which is shown) mounted on a rotor disk 280 (partially shown), which in turn is coupled to an engine shaft (not shown). The turbine stator assembly 200 directs the air toward the turbine rotor assembly 250. The air impinges upon rotor blades 260 of the turbine rotor assembly 250, thereby driving the turbine rotor assembly 250 for power extraction. To allow the turbine section 150 to operate at desirable elevated temperatures, certain components are cooled. For example, the rotor assembly 250 may be cooled as described in greater detail below.

Figure 3:
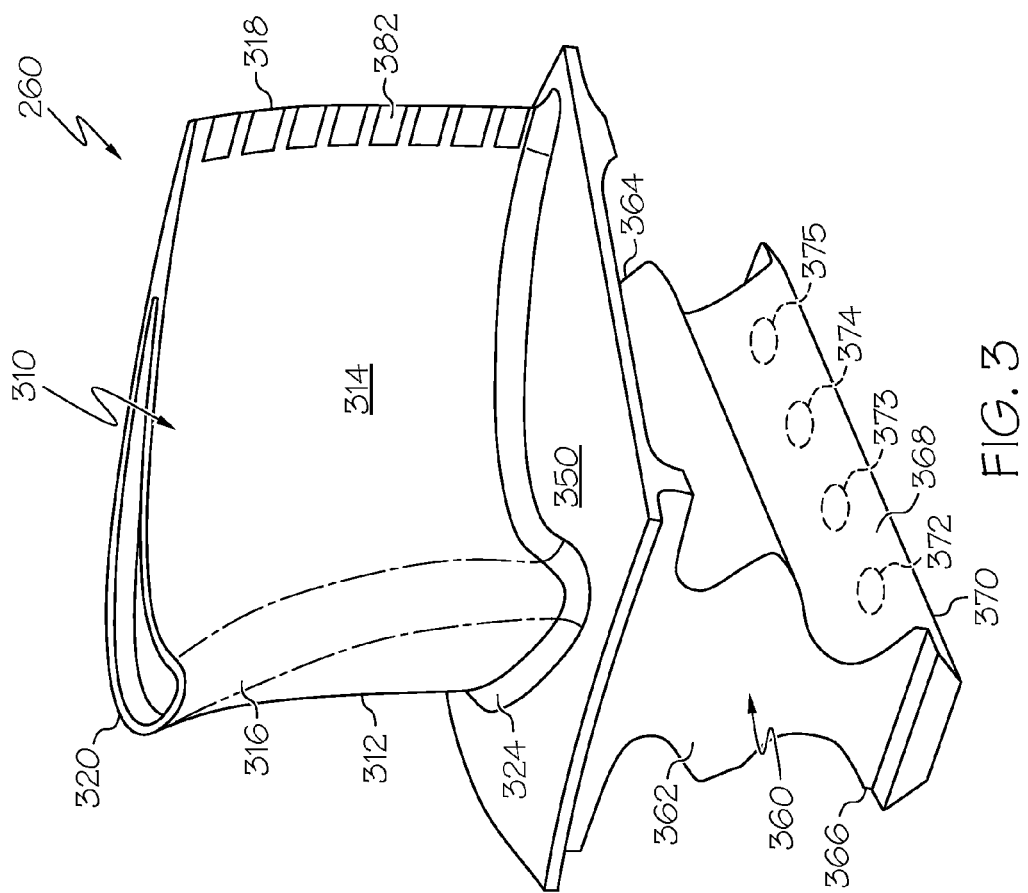
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350, and an attachment portion (or base portion or root) 360. The platform 350 is configured to radially contain turbine airflow within a shroud (e.g., shroud 210 of FIG. 2). The attachment portion 360 extends from the underside of the platform 350 and is configured to couple the blade 260 to a turbine rotor disc (not shown). In this manner, a circumferential ring of blades 260 may be formed about the rotor disc for rotation. In general, the turbine rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 has two side (or outer) walls 312, 314, each having outer surfaces that together define an airfoil shape. The first side wall 312 defines a suction side with a generally convex shape, and the second side wall 314 defines a pressure side with a generally concave shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. In an axial direction, the airfoil side walls 312, 314 extend from a platform base 324 to a tip portion (or blade tip) 320 is positioned to rotate in close proximity to the shroud 210 (FIG. 2).

In one exemplary embodiment, the attachment portion 360 has a "fir tree" configuration formed by a forward end face 362, an aft end face 364, side walls 366, 368, and a base surface 370. As shown, the side walls 366, 368 form one or more tangs or lobes that function to mount the rotor blade 260 onto the rotor disk 280, as described in greater detail below. Generally, the base surface 370 forms the underside or bottom of the rotor blade 260. In one exemplary embodiment, the side walls 366, 368 are parallel to one another, generally in an axial or longitudinal direction, while the base surface 370 is non-parallel to the side walls 366, 368. Instead, the base surface 370, generally between a forward edge and an aft edge, extends in a plane or surface that is non-parallel in a radial dimension relative to the side walls 366, 368, as well as the platform 350, as discussed below. As a result, the base surface 370 has a generally angled or curved configuration or arrangement.

In one exemplary embodiment, the base surface 370 defines one or more feed inlets 372, 373, 374, 375 (shown in dashed lines). The feed inlets 372-375 are coupled to fluid passages that extend through the attachment portion 360 and into the airfoil 310 as part of a cooling system, as described in greater detail below. Four feed inlets 372-375 are arranged in an axial row in the embodiment of FIG. 3, although any number or pattern of such feed inlets may be provided.

As noted above, the turbine rotor blade 260, particularly the airfoil 310, is subject to extremely high temperatures resulting from high velocity hot gases ducted from the combustion section 140 (FIG. 1). If unaddressed, the extreme heat may affect the useful life of an airfoil and/or impact the maximum operating temperature of the engine. As such, cooling is provided to maintain blade temperature at an acceptable level. Such cooling may include an internal cooling system that directs cooling air from feed inlets 372-375 in the attachment portion 360 through internal cavities and passages to cool various portions of the turbine rotor blade 260 via effusion, convection and conduction, including through trailing edge slots 382 to provide temperature control of the trailing edge 318 and/or through film cooling holes arranged to provide a cooling film onto various surfaces of the turbine rotor blade 260. Additional information about cooling the turbine rotor blade is provided below.

Figure 4:
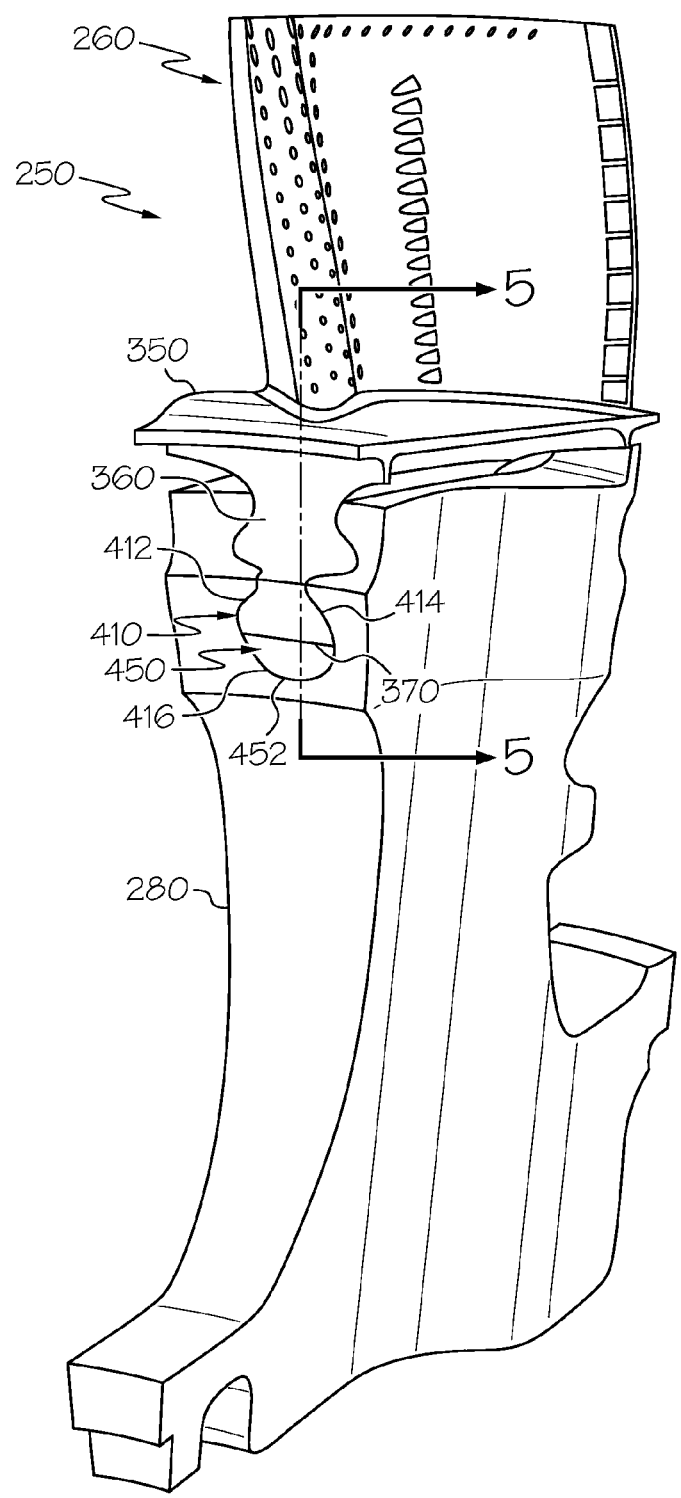
FIG. 4 is a partial, isometric view of a turbine rotor assembly of the turbine section of FIG. 2 in accordance with an exemplary embodiment.

FIG. 4 is a partial, isometric view of the turbine rotor assembly 250 of the turbine section 150 of FIG. 2 in accordance with an exemplary embodiment. As introduced above, the turbine rotor assembly 250 includes the rotor disk 280 and with a number of turbine rotor blades 260. For clarity, only a portion or slice of the rotor disk 280 and a single turbine rotor blade 260 are shown in FIG. 4.

The rotor disk 280 includes a plurality of slots 410 formed around the periphery of the rotor disk 280, although only a single slot 410 is shown in FIG. 4. The slots 410 generally extend in an axial direction from a forward disk face to an aft disk face. The slots 410 have a generally semi-circular shape formed by side walls 412, 414 and a slot bottom 416 to accommodate the attachment portion 360 of the rotor blade 260. The slot bottom 416 is generally flat. As described in greater detail below, the side walls 412, 414 are generally sized and shaped to correspond to the side walls 366, 368 (FIG. 3) of the attachment portion 360, subject to the formation of a slot cavity 450, discussed below. As such, the side walls 412, 414 typically have a shape corresponding to the fir-tree configuration discussed above, although other mating configurations may be provided for coupling the turbine rotor blades 260 to the rotor disk 280.

During assembly, the rotor blade 260 is mounted on the rotor disk 280 by inserting the attachment portion 360 into the slot 410. Similar rotor blades are mounted in corresponding slots around the periphery of the rotor disk 280. Upon completion, the platforms (e.g., platform 350) of adjacent rotor blades (e.g., rotor blade 260) form a portion of the hot gas flow path of the turbine section, such that power may be extracted from the combustion gases, as introduced above. Any number of similar rotor blades 260 may be mounted about the circumference of the rotor disk 280.

As also shown in FIG. 4, attachment portion 360 of the rotor blade 260 and the slot 410 of the rotor disk 280 cooperate to form a slot cavity 450. In a radial direction, the slot cavity 450 is generally formed between the base surface 370 of the rotor blade 260 and the slot bottom 416 of the slot 410. In a circumferential direction, the slot cavity 450 is formed by the side walls 412, 414 of the slot 410. In an axial direction, the slot cavity 450 extends from a slot cavity inlet 452 to a slot cavity outlet (not shown in FIG. 4). As such, these surfaces may define a cross-sectional area along an axial direction between the cavity inlet 452 and an outlet. Considering that the slot bottom 416 and side walls 412, 414 generally extend in the axial direction and/or parallel to one another, the cross-sectional area of the slot cavity 450 may be modified by changing the orientation of the base surface 370 of the turbine rotor blade 260 to be non-parallel to the slot bottom 416 and/or side walls 412, 414, as discussed in greater detail below.

Generally, the slot cavity 450 is configured to receive cooling air at the cavity inlet 452 and direct the cooling air into the feed inlets 372-375 (FIG. 3). The remaining cooling air is directed out of the slot cavity 450 through the slot cavity outlet. As noted above, the cooling air flowing through the feed inlets 372-375 functions to cool various portions of the rotor blade 260, while cooling air exiting the slot cavity outlet may function to cool the rear face of the rotor disk 280 and/or attachment portion 360. As will now be described in greater detail, the base surface 370 of the rotor blade 260 may be sized and shaped to provide desired flow characteristics through the slot cavity 450 and into the feed inlets 372-375.

Figure 5:
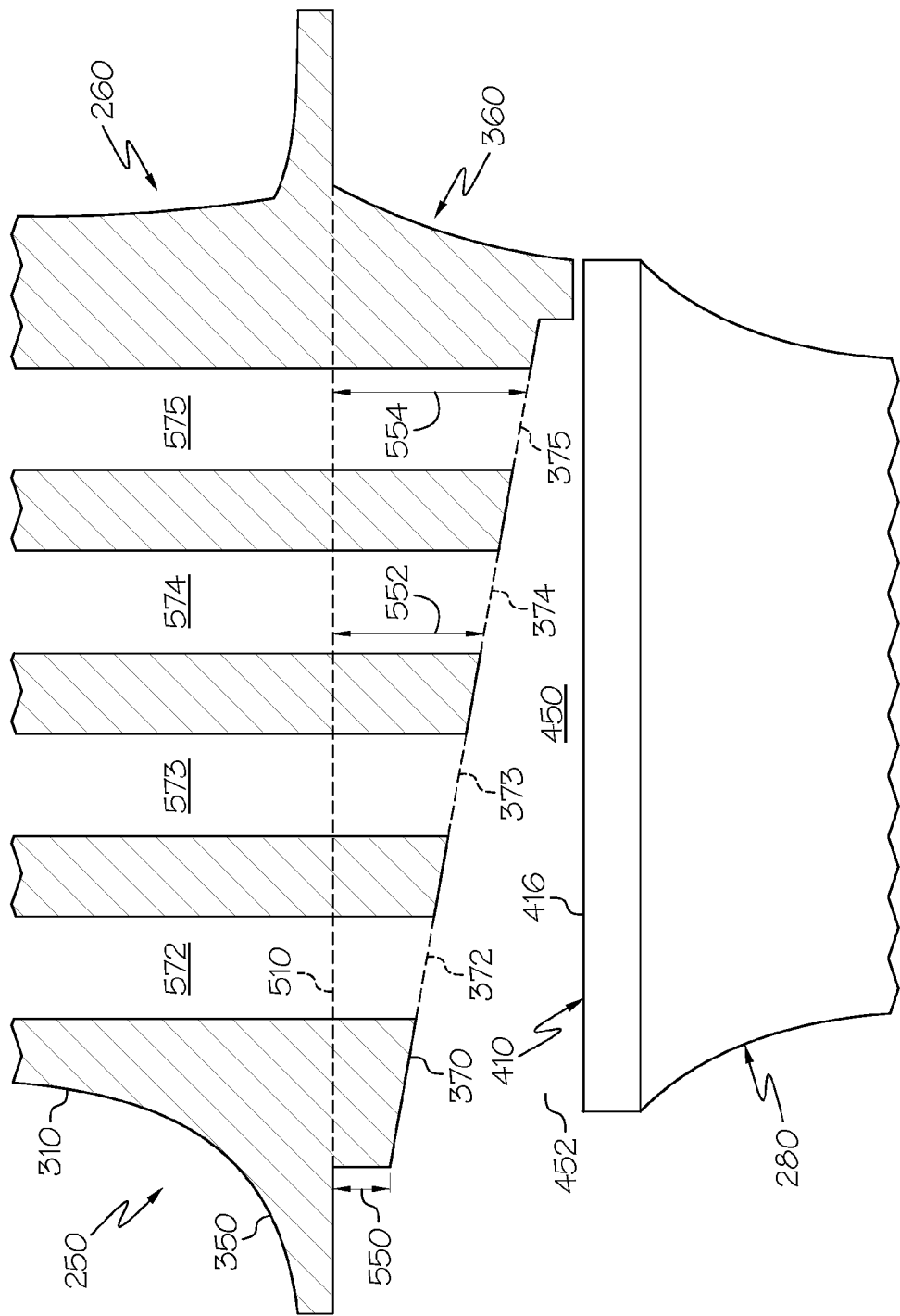
FIG. 5 is a partial, cross-sectional view of the turbine rotor assembly through line 5-5 of FIG. 4 in accordance with an exemplary embodiment.

FIG. 5 is a partial cross-sectional view of the turbine rotor assembly 250 through line 5-5 of FIG. 4 in accordance with an exemplary embodiment. In particular, and as introduced above, FIG. 5 depicts the attachment portion 360 of the turbine rotor blade 260 mounted in slot 410 of the rotor disk 280. As also discussed above, the slot bottom 416 and base surface 370 define the slot cavity 450 to receive cooling air through the cavity inlet 452 and to direct the cooling air into the feed inlets 372-375 formed in the base surface 370, which in turn, direct the cooling air through fluid passages 572, 573, 574, 575 extending through the attachment portion 360, platform 350, and airfoil 310.

During operation, it is generally advantageous to provide optimum flow characteristics for the cooling air flowing through the slot cavity 450 and into the feed inlets 372-375. These flow characteristics typically include the avoidance of vortices, uneven pressure distributions, and uneven flow distributions. As an example, it is generally desirable to provide even flow distributions to each of the feed inlets 372-375, while minimizing pressure losses through the slot cavity 450 and at the feed inlets 372-375. In other examples, it may be desirable to provide predetermined, different amounts of flow and pressure to the individual feed inlets 372-375.

As described in greater detail below, the attachment portion 360 is sized and shaped to provide advantageous flow characteristics. In one exemplary embodiment, the slot bottom 416 is generally flat and the slot side walls 412, 414 are generally uniform in the axial direction, typically parallel to one another. As such, modifying the size and shape of the attachment portion 360 such that the base surface 370 is non-parallel to the side walls 412, 414 and slot bottom 416 functions to adjust the cross-sectional area of the slot cavity 450, and thus, the flow characteristics of the cooling air flowing therethrough.

As shown in the view of FIG. 5, the cross-sectional area of the slot cavity 450 decreases in area along the axial direction. The decrease in cross-sectional area is a result of increase in depth (or length) of the attachment portion 360 such that the base surface 370 is slanted radially inward. Although the base surface 370 is interrupted by the feed inlets 372-375 in the particular view of FIG. 5, the general position and shape of the base surface 370 is depicted in these areas with a dashed line. As shown, the base surface 370 is generally slanted at a relatively constant angle. In other words, the depth of the attachment portion 360 increases linearly. In some embodiments, the improvements in the flow characteristics through the slot cavity 450 enable the elimination of flow structures along the slot bottom 416 and/or metering plates at the inlet feeds 372-375.

The depth of the attachment portion 360 may be defined in any suitable manner such that the position of the base surface 370 results in a decrease in cross-sectional area of the slot cavity 450. Exemplary depths 550, 552, and 554 are depicted in FIG. 5 as the respective radial distance from the boundary between the platform 350 and the attachment portion 360 (referenced by line 510) to the base surface 370. Depth 550 is the length or depth of the attachment portion 360 proximate to the cavity inlet 452 and/or the forward end of the base surface 370. Depth 552 is the length or depth of the attachment portion 360 proximate to the feed inlet 374. Depth 554 is the length or depth of the attachment portion 360 proximate to the feed inlet 375. As shown, depth 554 is greater than depth 552, which in turn is greater than depth 550. Typically, the overall depth decreases between the forward end and aft end of the base surface 370. Generally, the depth decrease may be dependent on the characteristics of the cooling scheme and the overall flow delivery system design. Although the term "depth" is used herein, this parameter may inversely be referred to as distance from an engine centerline.

The increase in depth of the attachment portion 360 and corresponding decrease in cross-sectional area functions to reduce undesired flow structures, such as vortices, particularly mid-channel vortices and aft-channel vortices. Reducing such vortices decreases uneven and detrimental pressure distributions, thereby leading to improved flow delivery to the feed inlets 372-375 and uniform pressure distributions and blade flow control. Computational fluid dynamic (CFD) analysis may be used to optimize the location and orientation of the base surface 370.

The length of the attachment portion 360 and corresponding shape and orientation of the base surface 370 shown in FIG. 5 is one exemplary embodiment for decreasing the cross-sectional shape of the slot cavity 450. FIGS. 6-15 depict additional embodiments for decreasing the cross-sectional shape of the slot cavity. Any number of factors may be considered to determine the cross-sectional shape of the slot cavity, including blade weight, flow characteristics, stress and wear considerations, and the like. Additionally, the cross-sectional shapes discussed below may be used in lieu of or in conjunction with other blade and slot cavity features, including modifications for individual feed inlets. For example, generally, the feed inlets discussed below in each embodiment have the same general shape to the other feed inlets of the respective embodiments, albeit with at different depths. However, as introduced above, one or more feed inlets of a particular embodiment may have a different shape or configuration from the other feed inlets of that embodiment.

Figure 6:
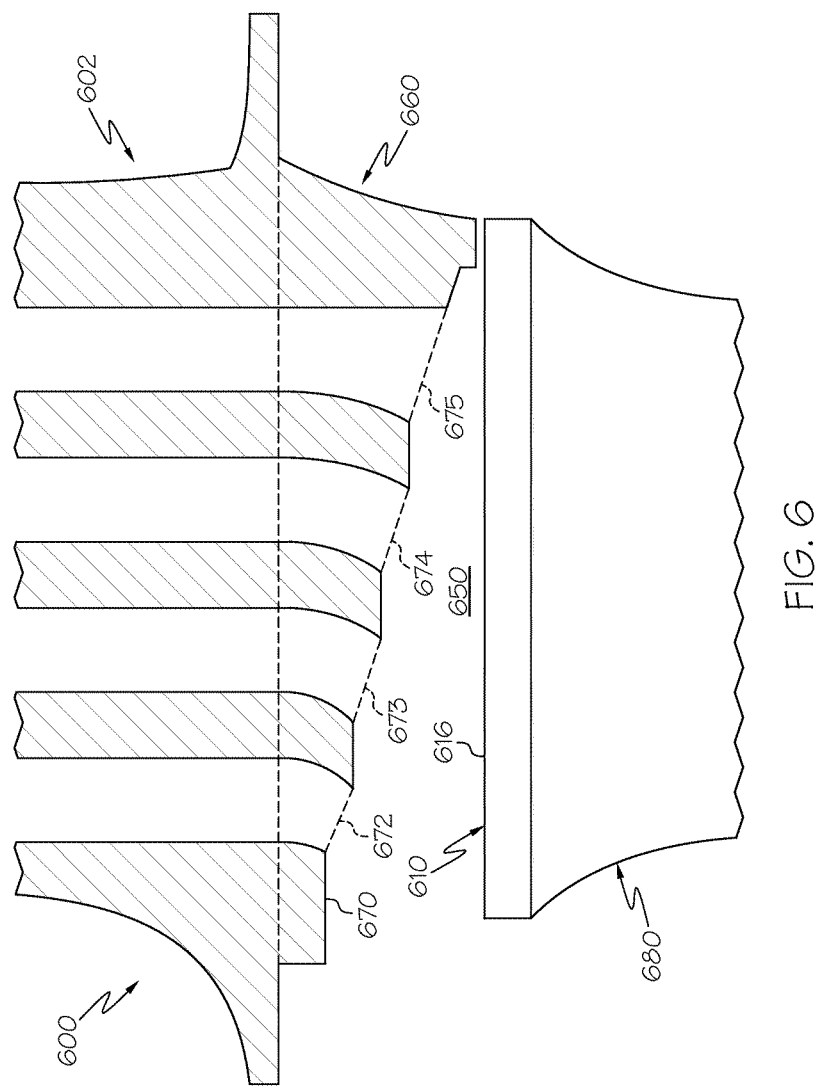
FIGS. 6-16 are partial, cross-sectional views of turbine rotor assemblies in accordance with alternate exemplary embodiments.

FIG. 6 is a partial cross-sectional view of a turbine rotor assembly 600 in accordance with an exemplary embodiment. Generally, the view of the turbine rotor assembly 600 corresponds to the view of the turbine rotor assembly 250 of FIG. 5. Unless otherwise noted, the discussion of turbine rotor assembly 250 of FIG. 5 is also applicable to the turbine rotor assembly 600 of FIG. 6. The turbine rotor assembly 600 may be incorporated into the turbine section of the gas turbine engines discussed above.

As above, the turbine rotor assembly 600 includes a turbine rotor blade 602 with an attachment portion 660 mounted in a slot 610 of a rotor disk 680 to form a slot cavity 650 between a base surface 670 and a slot bottom 616. In this exemplary embodiment, feed inlets 672, 673, 674, 675 are angled or curved in an upstream direction. This arrangement may assist the cooling air flowing into the feed inlets 672-675. Additionally, in this exemplary embodiment, the base surface 670 is stepped with flat (or axial) segments (or fillets) at various depths. In effect, the feed inlets 672-675 may be considered to be scoop inlets. As above, the depth of the base surface 670 increases along the axial length of the slot cavity 650, thereby decreasing the cross-sectional area of the slot cavity 650 and enhancing flow characteristics. Additionally, in this exemplary embodiment, each feed inlet 672-675 may increase in depth along the axial length of the respective inlet 672-675, as indicated by the dashed line spanning each inlet 672-675.

Figure 7:
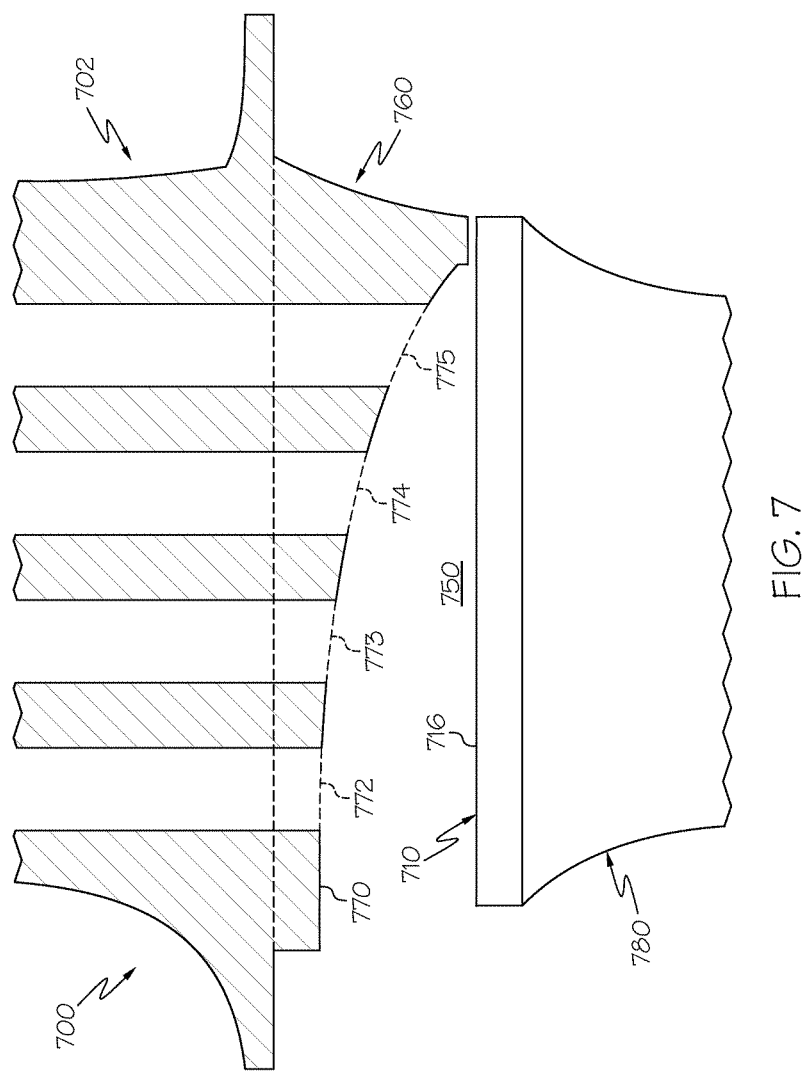

FIG. 7 is a partial cross-sectional view of a turbine rotor assembly 700 in accordance with an exemplary embodiment. Generally, the view of the turbine rotor assembly 700 corresponds to the view of the turbine rotor assembly 250 of FIG. 5. Unless otherwise noted, the discussion of turbine rotor assembly 250 of FIG. 5 is also applicable to the turbine rotor assembly 700 of FIG. 7. The turbine rotor assembly 700 may be incorporated into the turbine section of the gas turbine engines discussed above.

As above, the turbine rotor assembly 700 includes a turbine rotor blade 702 with an attachment portion 760 mounted in a slot 710 of a rotor disk 780 to form a slot cavity 750 between a base surface 770 and a slot bottom 716. Feed inlets 772, 773, 774, 775 are formed in the base surface 770. Additionally, in this exemplary embodiment, the base surface 770 has a generally concave shape. As above, the depth of the base surface 770 increases along the axial length of the slot cavity 750, thereby decreasing the cross-sectional area of the slot cavity 750 and enhancing flow characteristics.

Figure 8:
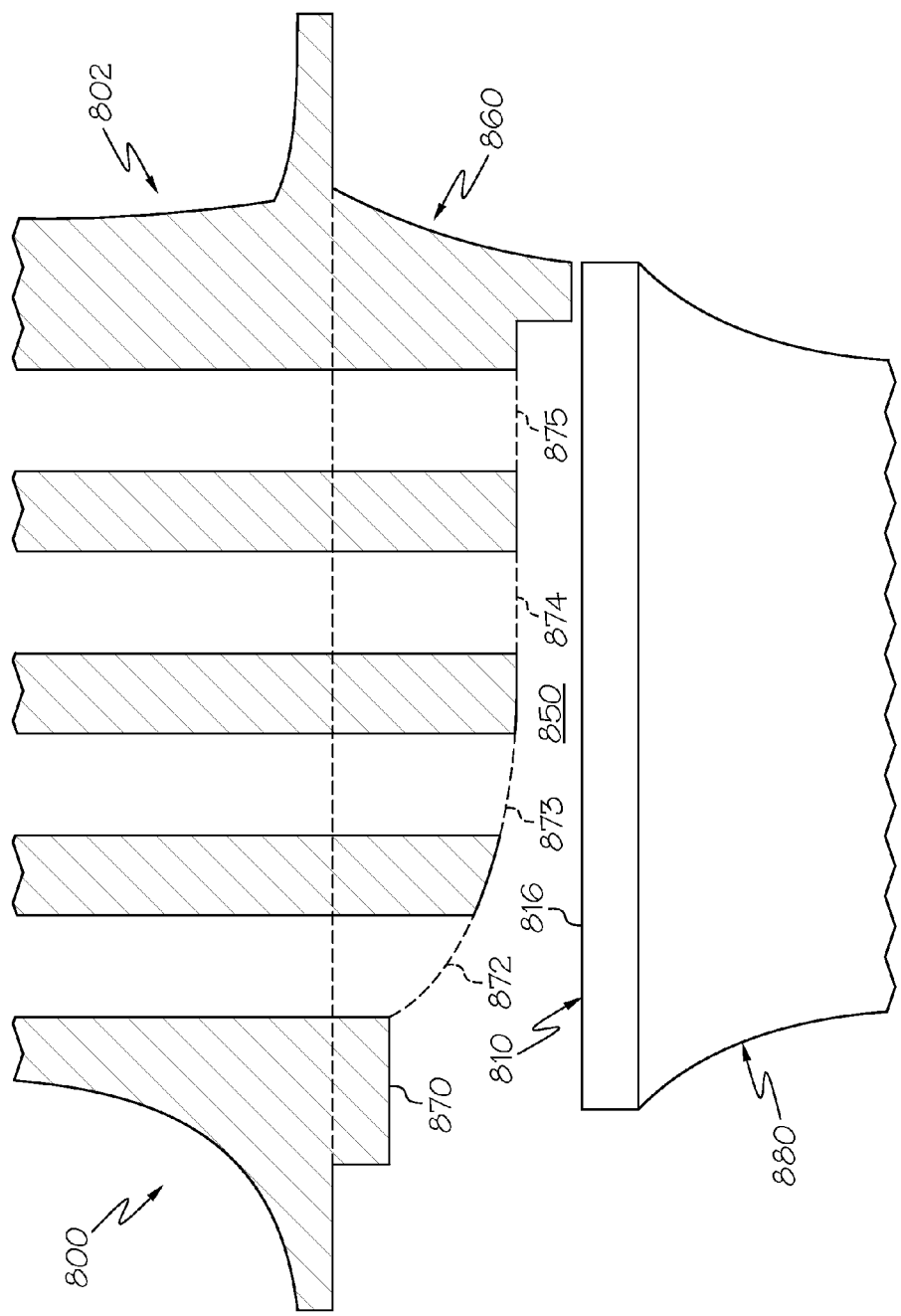

FIG. 8 is a partial cross-sectional view of a turbine rotor assembly 800 in accordance with an exemplary embodiment. Generally, the view of the turbine rotor assembly 800 corresponds to the view of the turbine rotor assembly 250 of FIG. 5. Unless otherwise noted, the discussion of turbine rotor assembly 250 of FIG. 5 is also applicable to the turbine rotor assembly 800 of FIG. 8. The turbine rotor assembly 800 may be incorporated into the turbine section of the gas turbine engines discussed above.

As above, the turbine rotor assembly 800 includes a turbine rotor blade 802 with an attachment portion 860 mounted in a slot 810 of a rotor disk 880 to form a slot cavity 850 between a base surface 870 and a slot bottom 816. Feed inlets 872, 873, 874, 875 are formed in the base surface 870. Additionally, in this exemplary embodiment, the base surface 870 has a generally convex shape. As above, the depth of the base surface 870 increases along the axial length of the slot cavity 850, thereby decreasing the cross-sectional area of the slot cavity 850 and enhancing flow characteristics.

Figure 9:
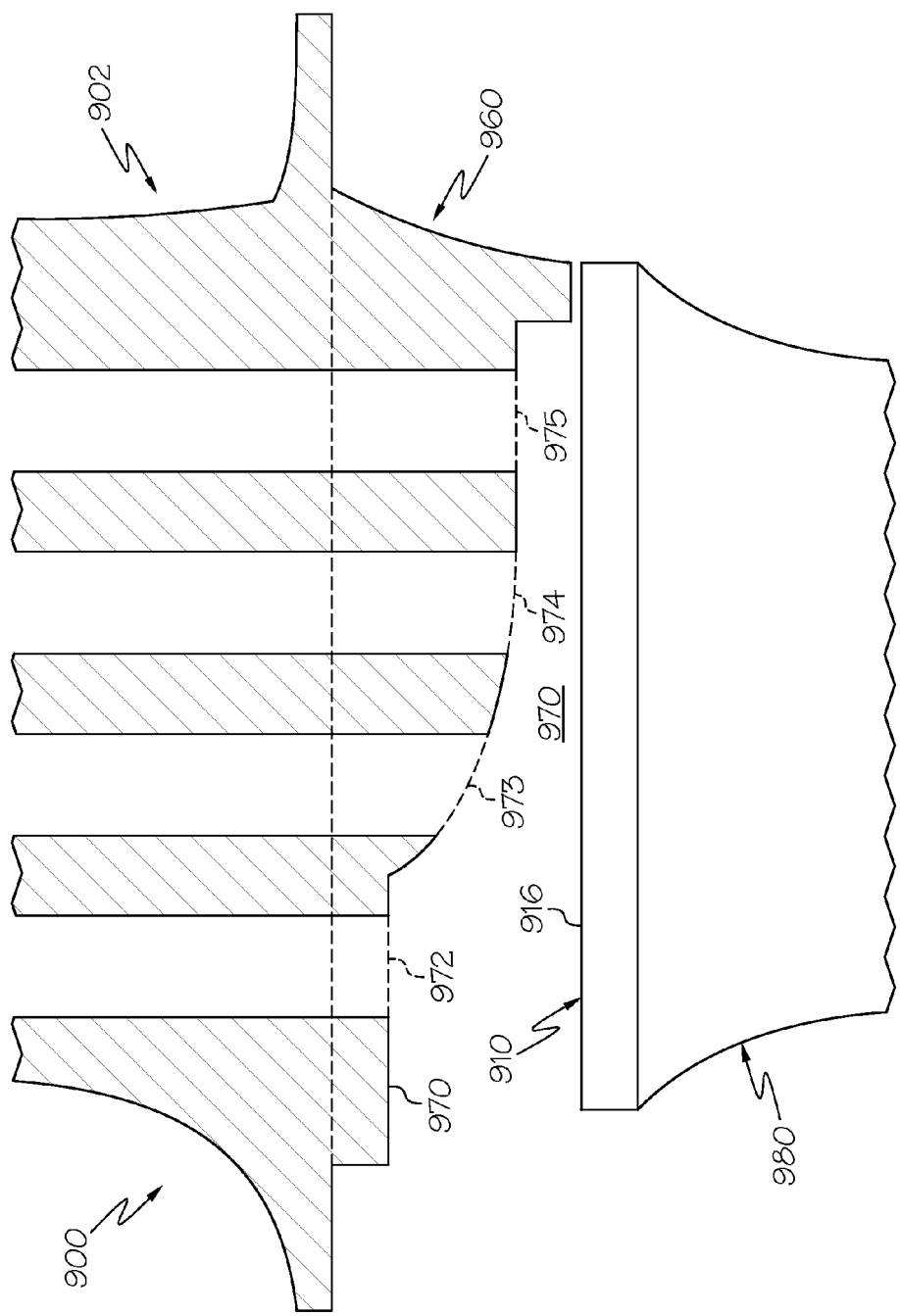

FIG. 9 is a partial cross-sectional view of a turbine rotor assembly 900 in accordance with an exemplary embodiment. Generally, the view of the turbine rotor assembly 900 corresponds to the view of the turbine rotor assembly 250 of FIG. 5. Unless otherwise noted, the discussion of turbine rotor assembly 250 of FIG. 5 is also applicable to the turbine rotor assembly 900 of FIG. 9. The turbine rotor assembly 900 may be incorporated into the turbine section of the gas turbine engines discussed above.

As above, the turbine rotor assembly 900 includes a turbine rotor blade 902 with an attachment portion 960 mounted in a slot 910 of a rotor disk 980 to form a slot cavity 950 between a base surface 970 and a slot bottom 916. Feed inlets 972, 973, 974, 975 are formed in the base surface 970. Additionally, in this exemplary embodiment, the base surface 970 has a first segment 976 that is generally flat and a second segment 977 downstream of the first segment 976 that is generally convex. As above, the depth of the base surface 970 increases along the axial length of the slot cavity 950, thereby decreasing the cross-sectional area of the slot cavity 950 and enhancing flow characteristics.

Figure 10:
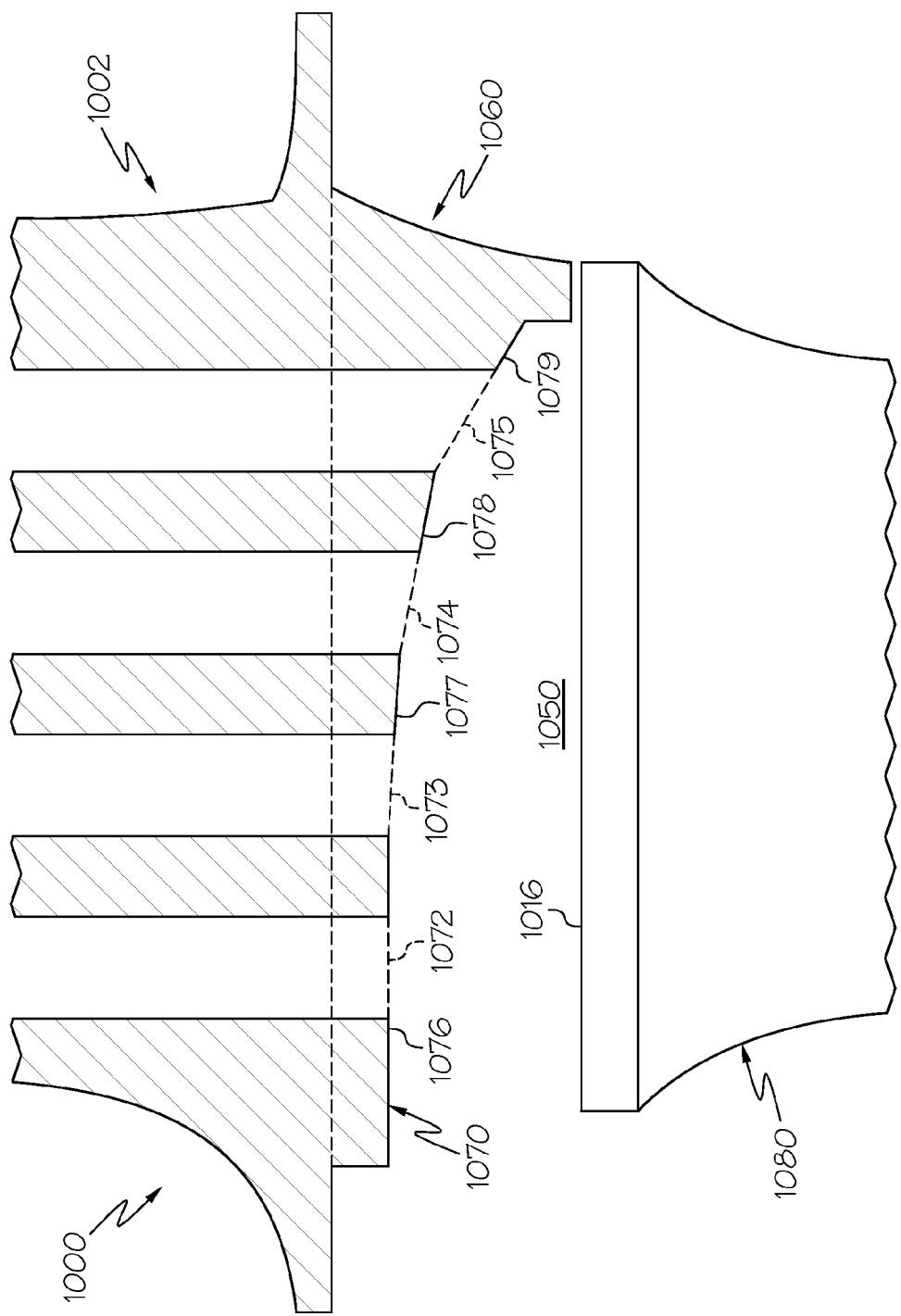

FIG. 10 is a partial cross-sectional view of a turbine rotor assembly 1000 in accordance with an exemplary embodiment. Generally, the view of the turbine rotor assembly 1000 corresponds to the view of the turbine rotor assembly 250 of FIG. 5. Unless otherwise noted, the discussion of turbine rotor assembly 250 of FIG. 5 is also applicable to the turbine rotor assembly 1000 of FIG. 10. The turbine rotor assembly 1000 may be incorporated into the turbine section of the gas turbine engines discussed above.

As above, the turbine rotor assembly 1000 includes a turbine rotor blade 1002 with an attachment portion 1060 mounted in a slot 1010 of a rotor disk 1080 to form a slot cavity 1050 between a base surface 1070 and a slot bottom 1016. Feed inlets 1072, 1073, 1074, 1075 are formed in the base surface 1070. Additionally, in this exemplary embodiment, the base surface 1070 has a first segment 1076, a second segment 1077, a third segment 1078, and a fourth segment 1079, each of which are angled at different slopes. As above, the depth of the base surface 1070 increases along the axial length of the slot cavity 1050, thereby decreasing the cross-sectional area of the slot cavity 1050 and enhancing flow characteristics.

Figure 11:
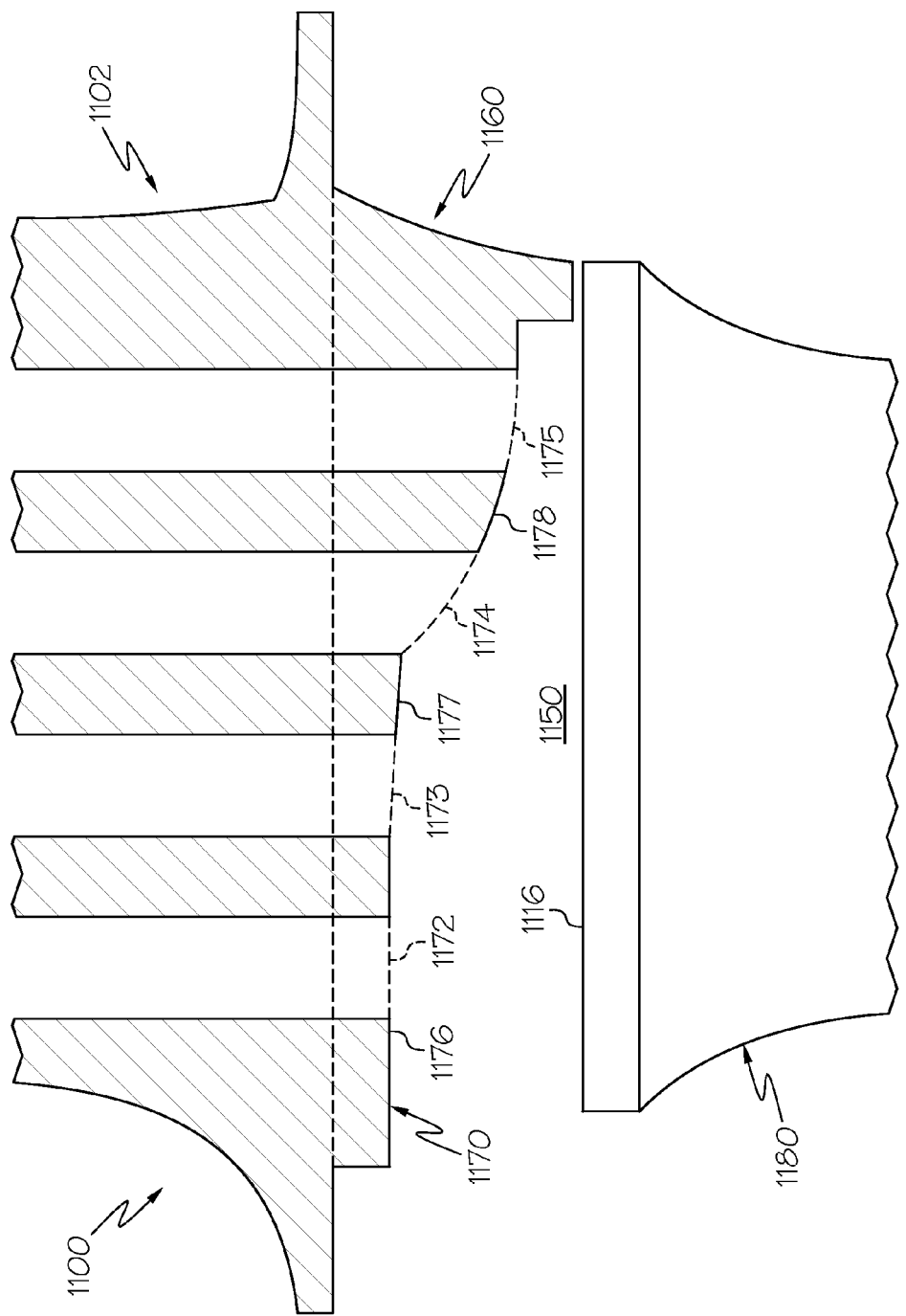

FIG. 11 is a partial cross-sectional view of a turbine rotor assembly 1100 in accordance with an exemplary embodiment. Generally, the view of the turbine rotor assembly 1100 corresponds to the view of the turbine rotor assembly 250 of FIG. 5. Unless otherwise noted, the discussion of turbine rotor assembly 250 of FIG. 5 is also applicable to the turbine rotor assembly 1100 of FIG. 11. The turbine rotor assembly 1100 may be incorporated into the turbine section of the gas turbine engines discussed above.

As above, the turbine rotor assembly 1100 includes a turbine rotor blade 1102 with an attachment portion 1160 mounted in a slot 1110 of a rotor disk 1180 to form a slot cavity 1150 between a base surface 1170 and a slot bottom 1116. Feed inlets 1172, 1173, 1174, 1175 are formed in the base surface 1170. Additionally, in this exemplary embodiment, the base surface 1170 has a first segment 1176, a second segment 1177, and a third segment 1178. In this embodiment, the first and second segments 1176, 1177 are angled segments with different slopes from one another, while the third segment 1178 is convex, thereby resulting in a base surface 1170 with a combination of angled and convex shaped segments. As above, the depth of the base surface 1170 increases along the axial length of the slot cavity 1150, thereby decreasing the cross-sectional area of the slot cavity 1150 and enhancing flow characteristics.

Figure 12:
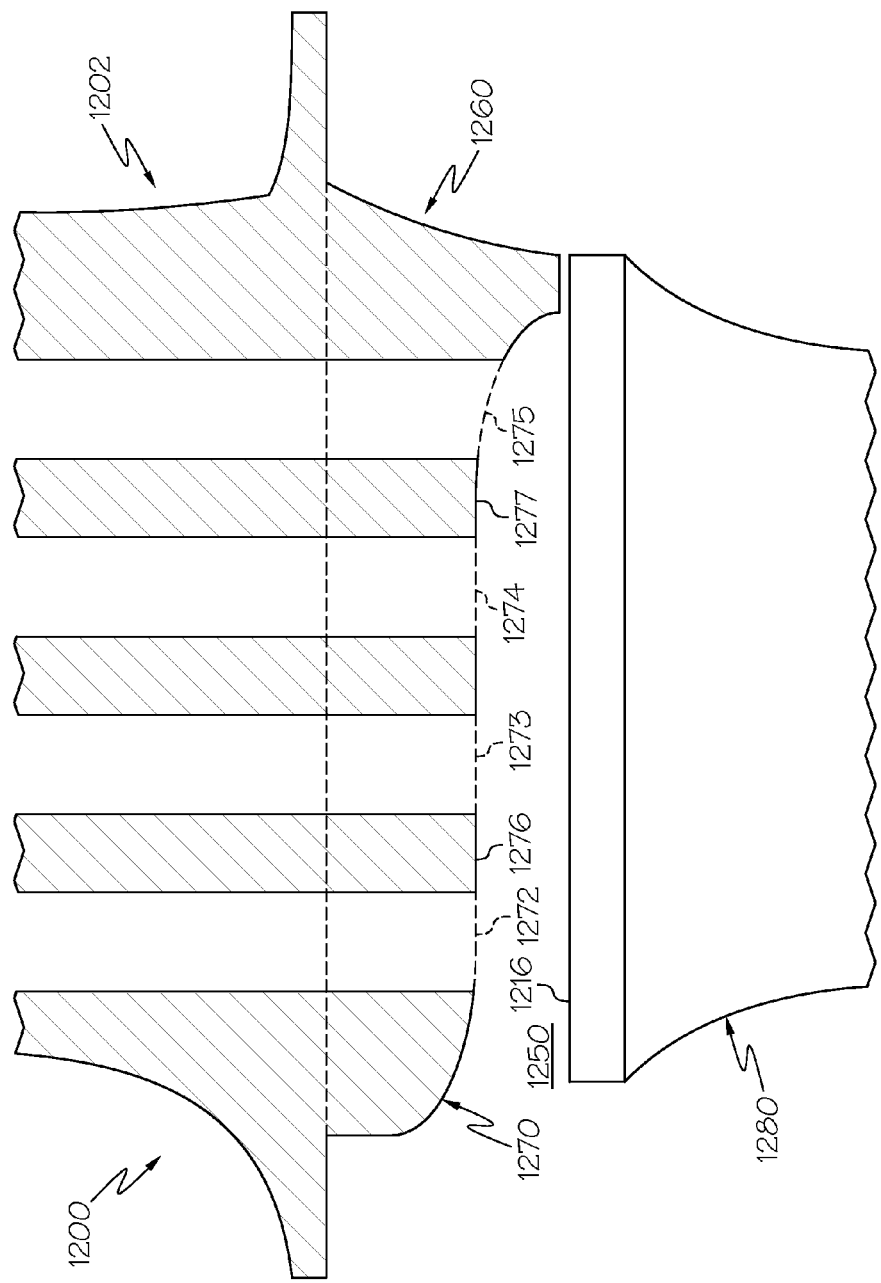

FIG. 12 is a partial cross-sectional view of a turbine rotor assembly 1200 in accordance with an exemplary embodiment. Generally, the view of the turbine rotor assembly 1200 corresponds to the view of the turbine rotor assembly 250 of FIG. 5. Unless otherwise noted, the discussion of turbine rotor assembly 250 of FIG. 5 is also applicable to the turbine rotor assembly 1200 of FIG. 12. The turbine rotor assembly 1200 may be incorporated into the turbine section of the gas turbine engines discussed above.

As above, the turbine rotor assembly 1200 includes a turbine rotor blade 1202 with an attachment portion 1260 mounted in a slot 1210 of a rotor disk 1280 to form a slot cavity 1250 between a base surface 1270 and a slot bottom 1216. Feed inlets 1272, 1273, 1274, 1275 are formed in the base surface 1270. Additionally, in this exemplary embodiment, the base surface 1270 has a first segment 1276 and a second segment 1277. In this embodiment, the first segment 1276 is convex and the second segment 1277 is concave, thereby resulting in a base surface 1270 with a combination of convex and concave shaped segments. As above, the depth of the base surface 1270 increases along the axial length of the slot cavity 1250, thereby decreasing the cross-sectional area of the slot cavity 1250 and enhancing flow characteristics.

Figure 13:
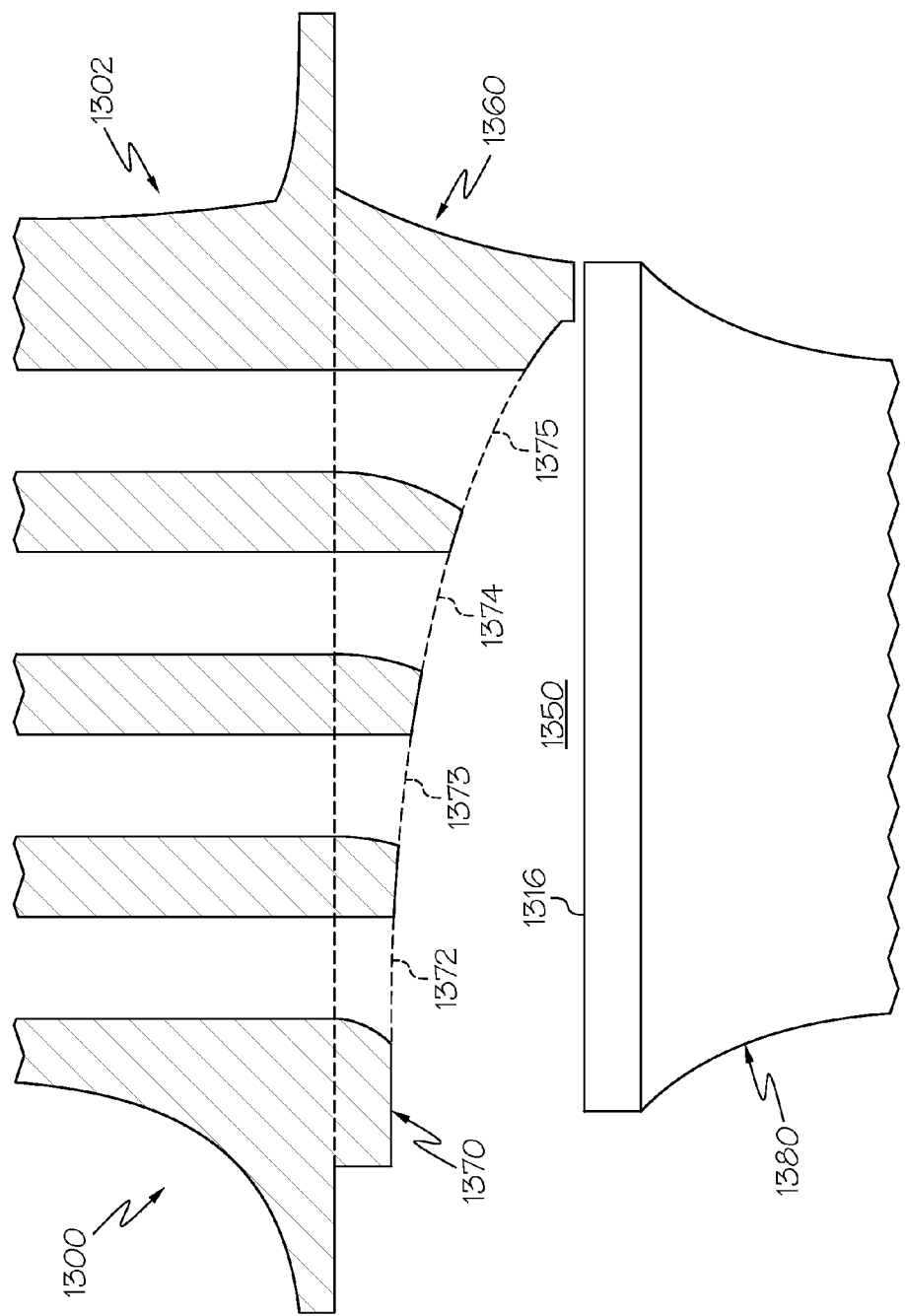

FIG. 13 is a partial cross-sectional view of a turbine rotor assembly 1300 in accordance with an exemplary embodiment. Generally, the view of the turbine rotor assembly 1300 corresponds to the view of the turbine rotor assembly 250 of FIG. 5. Unless otherwise noted, the discussion of turbine rotor assembly 250 of FIG. 5 is also applicable to the turbine rotor assembly 1300 of FIG. 13. The turbine rotor assembly 1300 may be incorporated into the turbine section of the gas turbine engines discussed above.

As above, the turbine rotor assembly 1300 includes a turbine rotor blade 1302 with an attachment portion 1360 mounted in a slot 1310 of a rotor disk 1380 to form a slot cavity 1350 between a base surface 1370 and a slot bottom 1316. Feed inlets 1372, 1373, 1374, 1375 are formed in the base surface 1370. In this exemplary embodiment, the base surface 1370 has a generally curved shape with an increasing depth, thereby decreasing the cross-sectional area of the slot cavity 1350 and enhancing flow characteristics. Additionally, in this embodiment, each of the feed inlets 1372, 1373, 1374, 1375 has a curved leading edge, thereby further enhancing flow characteristics by enabling smoother cooling air flow into each feed inlet 1372, 1373, 1374, 1375.

Figure 14:
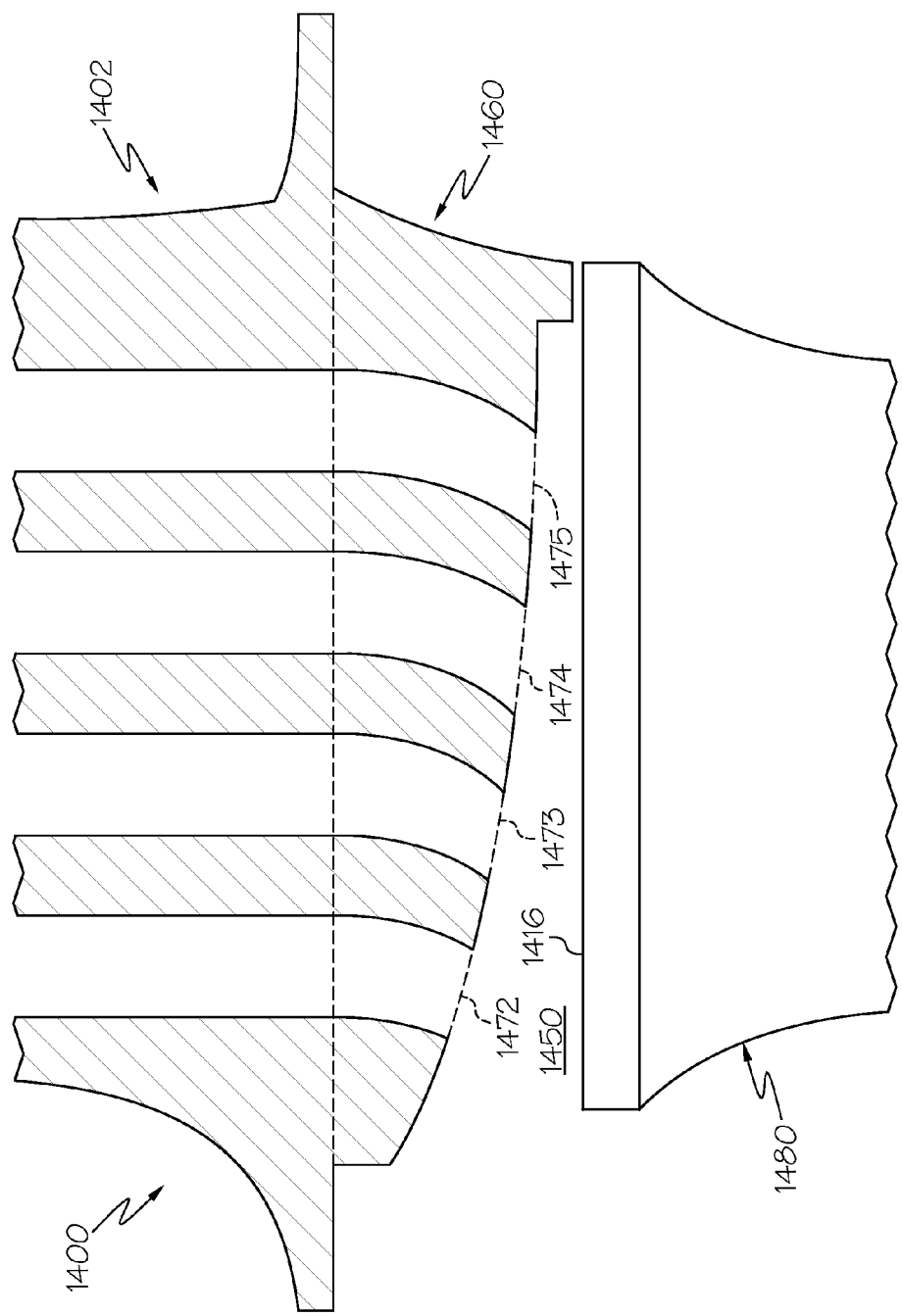

FIG. 14 is a partial cross-sectional view of a turbine rotor assembly 1400 in accordance with an exemplary embodiment. Generally, the view of the turbine rotor assembly 1400 corresponds to the view of the turbine rotor assembly 250 of FIG. 5. Unless otherwise noted, the discussion of turbine rotor assembly 250 of FIG. 5 is also applicable to the turbine rotor assembly 1400 of FIG. 14. The turbine rotor assembly 1400 may be incorporated into the turbine section of the gas turbine engines discussed above.

As above, the turbine rotor assembly 1400 includes a turbine rotor blade 1402 with an attachment portion 1460 mounted in a slot 1410 of a rotor disk 1480 to form a slot cavity 1450 between a base surface 1470 and a slot bottom 1416. Feed inlets 1472, 1473, 1474, 1475 are formed in the base surface 1470. In this exemplary embodiment, the base surface 1470 has a generally curved shape with an increasing depth, thereby decreasing the cross-sectional area of the slot cavity 1450 and enhancing flow characteristics. Additionally, in this embodiment, each of the feed inlets 1472, 1473, 1474, 1475 has a curved leading edge and a curved trailing edge, thereby further enhancing flow characteristics by enabling smoother cooling air flow into each feed inlet 1472, 1473, 1474, 1475.

Figure 15:
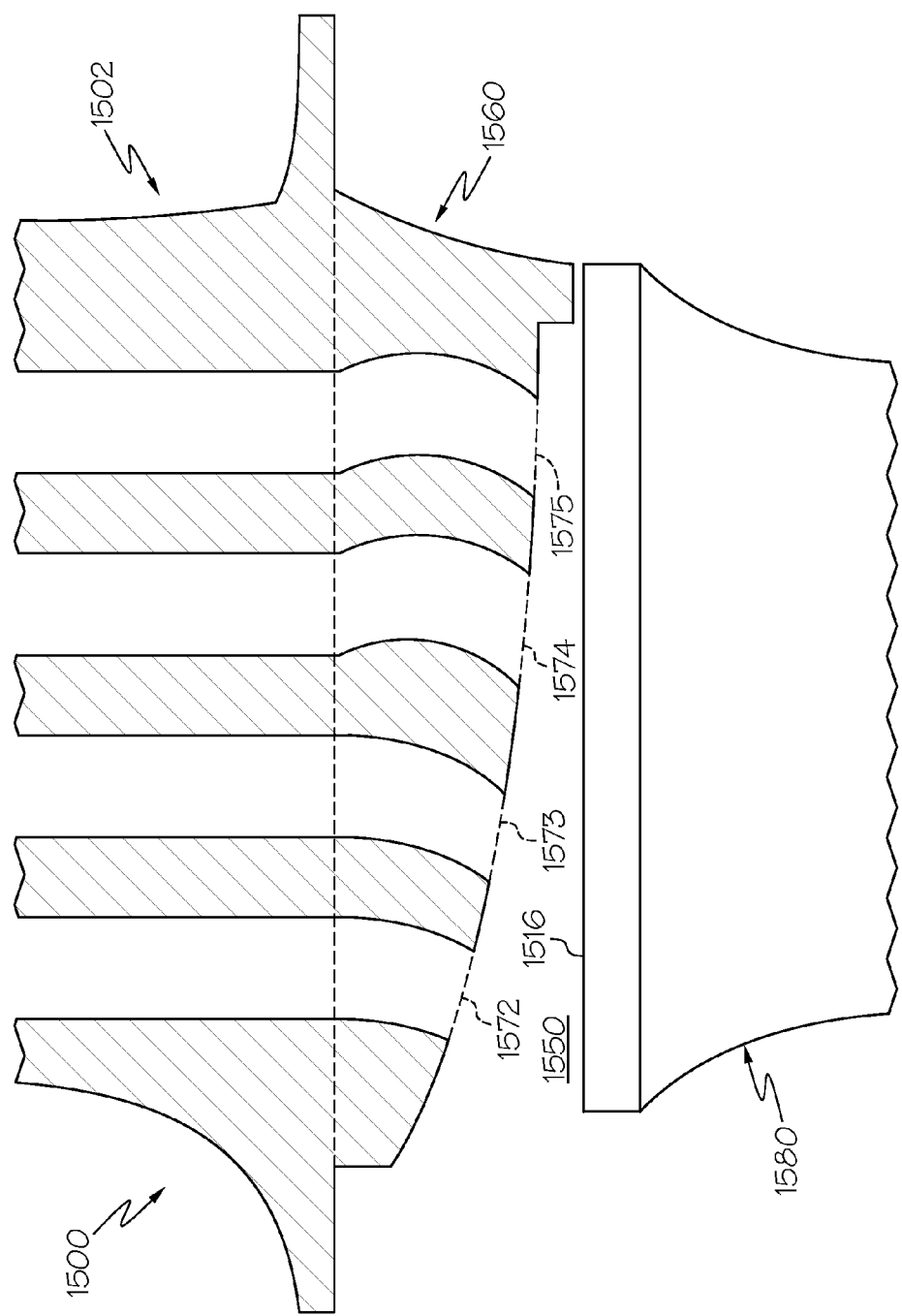

FIG. 15 is a partial cross-sectional view of a turbine rotor assembly 1500 in accordance with an exemplary embodiment. Generally, the view of the turbine rotor assembly 1500 corresponds to the view of the turbine rotor assembly 250 of FIG. 5. Unless otherwise noted, the discussion of turbine rotor assembly 250 of FIG. 5 is also applicable to the turbine rotor assembly 1500 of FIG. 15. The turbine rotor assembly 1500 may be incorporated into the turbine section of the gas turbine engines discussed above.

As above, the turbine rotor assembly 1500 includes a turbine rotor blade 1502 with an attachment portion 1560 mounted in a slot 1510 of a rotor disk 1580 to form a slot cavity 1550 between a base surface 1570 and a slot bottom 1516. Feed inlets 1572, 1573, 1574, 1575 are formed in the base surface 1570. In this exemplary embodiment, the base surface 1570 has a generally curved shape with an increasing depth, thereby decreasing the cross-sectional area of the slot cavity 1550 and enhancing flow characteristics. Additionally, in this embodiment, each of the feed inlets 1572, 1573, 1574, 1575 has a curved leading edge and a curved trailing edge, thereby further enhancing flow characteristics by enabling smoother cooling air flow into each feed inlet 1572, 1573, 1574, 1575. As shown, the feed inlets 1572, 1573 have generally moderate curved leading and trailing edges, while the feed inlets 1574, 1575 have more aggressive curved leading and trailing edges.

Figure 16:
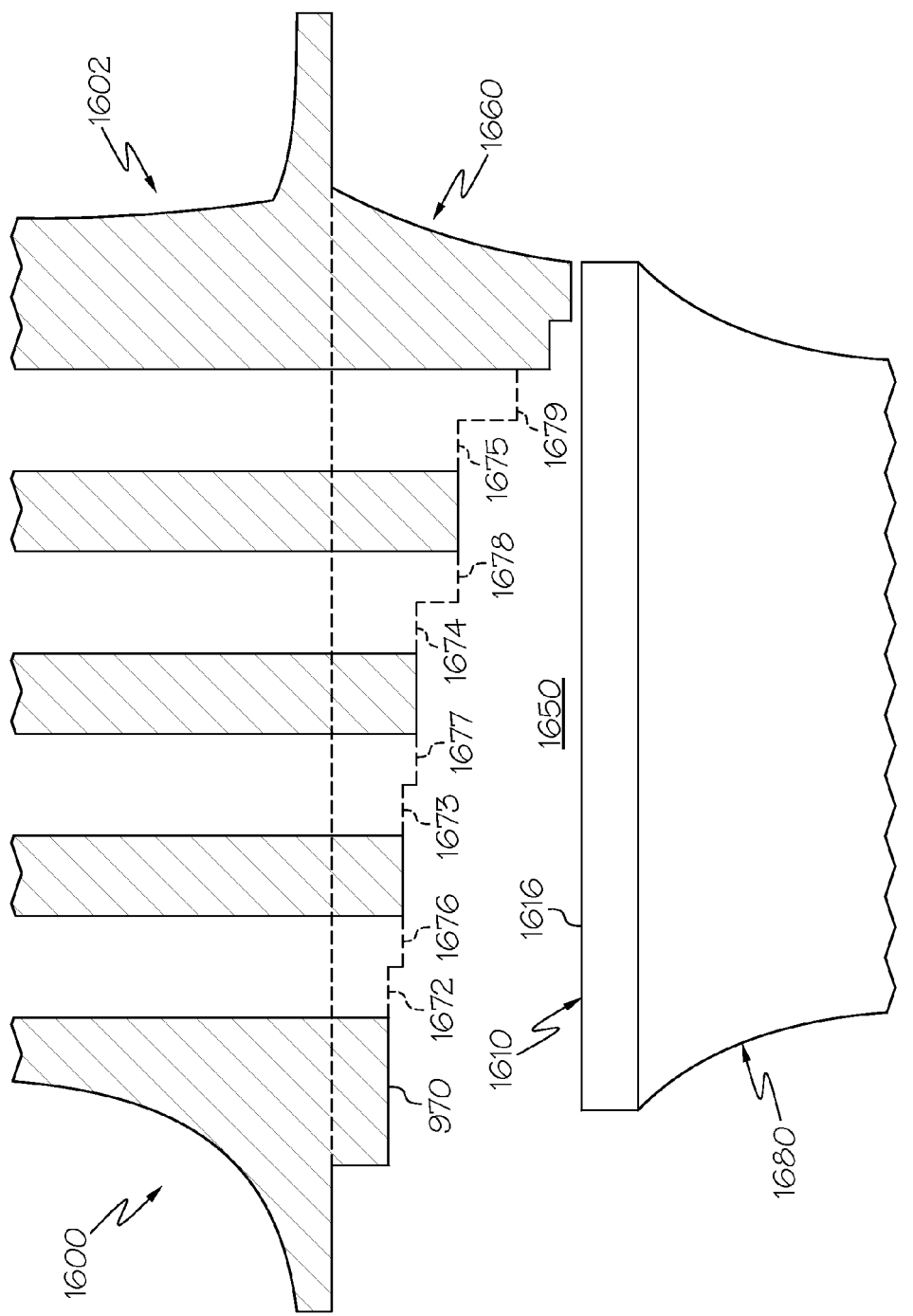

FIG. 16 is a partial cross-sectional view of a turbine rotor assembly 1600 in accordance with an exemplary embodiment. Generally, the view of the turbine rotor assembly 1600 corresponds to the view of the turbine rotor assembly 250 of FIG. 5. Unless otherwise noted, the discussion of turbine rotor assembly 250 of FIG. 5 is also applicable to the turbine rotor assembly 1600 of FIG. 16. The turbine rotor assembly 1600 may be incorporated into the turbine section of the gas turbine engines discussed above.

As above, the turbine rotor assembly 1600 includes a turbine rotor blade 1602 with an attachment portion 1660 mounted in a slot 1610 of a rotor disk 1680 to form a slot cavity 1650 between a base surface 1670 and a slot bottom 1616. Feed inlets 1672, 1673, 1674, 1675 are formed in the base surface 1670. Additionally, in this exemplary embodiment, the base surface 1670 has a generally stepped configuration with steps 1676, 1677, 1678, 1679 extending to the middle of each inlet 1672, 1673, 1674, 1675, respectively. As above, the depth of the base surface 1670 increases along the axial length of the slot cavity 1650, thereby decreasing the cross-sectional area of the slot cavity 1650 and enhancing flow characteristics.

Although the turbine rotor assemblies 250, 600, 700, 800, 900, 1000, 1100, 1200, 1300, 1400, 1500, 1600 depicted in FIGS. 5-16 are discussed as a single or integral component, in other embodiments, the turbine rotor assemblies 250, 600, 700, 800, 900, 1000, 1100, 1200, 1300, 1400, 1500, 1600 may be formed by a number of components. In other words, a shim or attachment may be mounted onto the underside of an existing or conventional rotor assembly to form a rotor assembly that results in the shapes and configurations discussed above.

Figure 17:
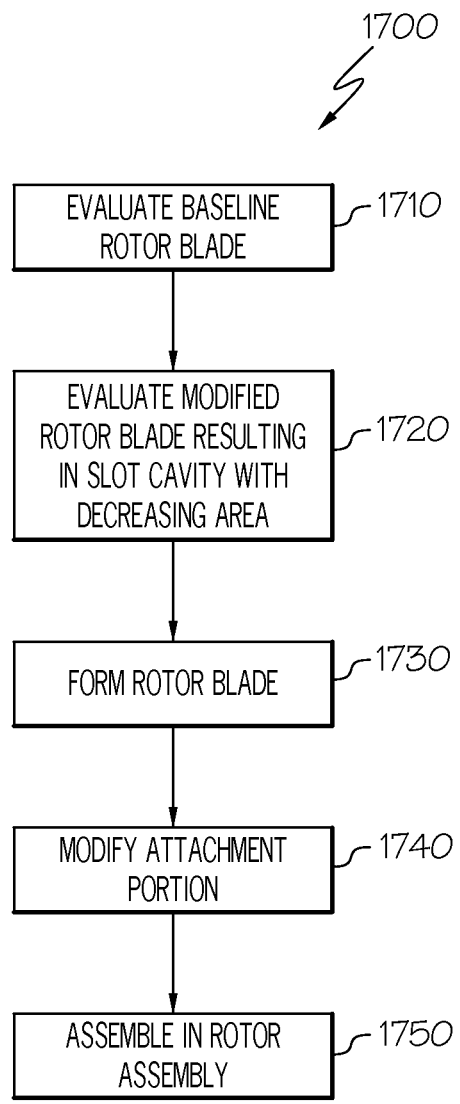
FIG. 17 is a flow chart of a method for forming a turbine rotor assembly in accordance with an exemplary embodiment.

The exemplary embodiments discussed above may be manufactured in any suitable way. As one example, FIG. 17 is a flow chart of a method 1700 for forming a turbine rotor assembly (e.g., turbine rotor assemblies 250, 600, 700, 800, 900, 1000, 1100, 1200, 1300, 1400, 1500, 1600 of FIGS. 5-16) in accordance with an exemplary embodiment.

In a first step 1710, a baseline turbine rotor assembly is considered, for example, with CFD analysis to evaluate flow characteristics. Generally, such turbine rotor assemblies correspond to the turbine rotor assemblies discussed above in which turbine rotor blades are mounted on a rotor disk in a turbine section. As above, each turbine rotor blade forms a slot cavity with the rotor disk to direct air through the slot cavity and into inlet feeds for cooling. In general, the baseline turbine rotor assembly may include a rotor blade with a flattened bottom surface such that a slot cavity with a generally constant cross-sectional area is formed.

In a second step 1720, the attachment portion and base surface of the turbine rotor blade are modified and reevaluated in view of the resulting flow characteristics. In one exemplary embodiment and as discussed above, the attachment portion and base surface are generally modified such that the cross-sectional area of the slot cavity decreases in an axial direction. Any suitable modifications and adjustments may be made, including a base surface with slanted or angled sections, curved sections, stepped sections, inlet curvatures, and the like, as discussed above. The base surface adjustments may be evaluated with CFD analysis until satisfactory flow characteristics are achieved.

In a third step 1730, the turbine rotor blade is formed. Any suitable manufacturing technique may be provided, including casting and additive manufacturing techniques. Typically, in this step, the turbine rotor blade is formed with a flat base surface.

In a fourth step 1740, the attachment portion, and thus the base surface, of the turbine rotor blade is modified in accordance with the evaluation in the second step 1720. For example, the various slanted, curved, and inlet segments may be formed in the attachment portion to result in the desired base surface shape. The attachment portion may be modified with any suitable technique, including machining, grinding, wire EDM, and the like. In some embodiments, steps 1730 and 1740 may be combined such that the turbine rotor blade is directly formed (such as casted) with the desired base surface shape.

In a final step 1750, the turbine rotor blade is mounted onto the rotor disk with similar turbine rotor blades for assembly into the turbine section of a gas turbine engine.

As a result, the turbine assemblies and methods discussed above enable more efficient cooling and/or improved operation of gas turbine engines. Additionally, the improved cooling may enable a reduction in cooling air that may be used in other locations and/or redirected to mainstream gas flow. Exemplary embodiments discussed above have resulted in an ability to increase engine temperature, thereby improving fuel consumption. Exemplary embodiments promote the service life and/or enhanced performance in a cost-effective manner. The turbine assemblies produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine rotor assembly for a turbine section of an engine, the turbine rotor assembly comprising:
   a rotor disk with a plurality of slots formed about a periphery of the rotor disk, wherein a first slot of the plurality of slots includes a slot bottom and slot side walls; and
   a first turbine rotor blade, comprising:
      a platform with a first side and a second side;
      an airfoil extending from the first side of the platform; and
      an attachment portion extending from the second side of the platform and arranged within the first slot of the rotor disk, wherein the attachment portion includes first and second side surfaces and a base surface,
      wherein the attachment portion includes feed inlets defined in the base surface for receiving cooling air, wherein the feed inlets include at least a first feed inlet and a second feed inlet, and
   wherein the base surface and the slot bottom define a slot cavity with a slot inlet, the slot cavity configured to receive the cooling air through the slot inlet and direct the cooling air into the feed inlets,
   wherein the slot cavity has a cross-sectional area that decreases along a generally axial direction, and wherein the first feed inlet is positioned at a first depth from the slot bottom wall to the first feed inlet, and the second feed inlet is positioned at a second depth from the slot bottom wall to the second feed inlet, and wherein the first depth is greater than the second depth, and wherein the base surface includes a plurality of angled segments, each with a different slope, in between the first and second feed inlets.

2. The turbine rotor assembly of claim 1, wherein the base surface includes at least one curved segment or at least one of the angled segments at each of the feed inlets and in between the feed inlets.

3. The turbine rotor assembly of claim 1, wherein the base surface has a forward end and an aft end, and wherein the attachment portion has a first radial length between the platform and the forward end of the base surface and a second radial length between the platform and the aft end of the base surface, the second radial length being greater that the first radial length.

4. The turbine rotor assembly of claim 1, wherein the feed inlets are scooped.

5. The turbine rotor assembly of claim 1, wherein the base surface further includes at least one concave segment in between the first and second feed inlets.

6. The turbine rotor assembly of claim 1, wherein the base surface further includes at least one convex segment in between the first and second feed inlets.

7. A turbine rotor assembly for a turbine section of an engine, the turbine rotor assembly comprising:
 a rotor disk with a plurality of slots formed about a periphery of the rotor disk, wherein a first slot of the plurality of slots includes a slot bottom and slot side walls; and
 a first turbine rotor blade, comprising:
  a platform with a first side and a second side;
  an airfoil extending from the first side of the platform; and
  an attachment portion extending from the second side of the platform and arranged within the first slot of the rotor disk, wherein the attachment portion includes first and second side surfaces and a base surface,
  wherein the attachment portion includes feed inlets defined in the base surface for receiving cooling air, wherein the feed inlets include at least a first feed inlet and a second feed inlet, and
 wherein the base surface and the slot bottom define a slot cavity with a slot inlet, the slot cavity configured to receive the cooling air through the slot inlet and direct the cooling air into the feed inlets,
 wherein the slot cavity has a cross-sectional area that decreases along a generally axial direction, and wherein the first feed inlet is positioned at a first depth from the slot bottom wall to the first feed inlet, and the second feed inlet is positioned at a second depth from the slot bottom wall to the second feed inlet, and wherein the first depth is greater than the second depth, and wherein the base surface includes at least one concave segment in between the first and second feed inlets.

8. The turbine rotor assembly of claim 7, wherein the base surface has a forward end and an aft end, and wherein the attachment portion has a first radial length between the platform and the forward end of the base surface and a second radial length between the platform and the aft end of the base surface, the second radial length being greater that the first radial length.

9. The turbine rotor assembly of claim 7, wherein the base surface includes at least one convex segment in between the first and second feed inlets.

10. The turbine rotor assembly of claim 7, wherein the feed inlets are scooped.

11. A turbine rotor assembly for a turbine section of an engine, the turbine rotor assembly comprising:
 a rotor disk with a plurality of slots formed about a periphery of the rotor disk, wherein a first slot of the plurality of slots includes a slot bottom and slot side walls; and
 a first turbine rotor blade, comprising:
  a platform with a first side and a second side;
  an airfoil extending from the first side of the platform; and
  an attachment portion extending from the second side of the platform and arranged within the first slot of the rotor disk, wherein the attachment portion includes first and second side surfaces and a base surface,
  wherein the attachment portion includes feed inlets defined in the base surface for receiving cooling air, wherein the feed inlets include at least a first feed inlet and a second feed inlet, and
 wherein the base surface and the slot bottom define a slot cavity with a slot inlet, the slot cavity configured to receive the cooling air through the slot inlet and direct the cooling air into the feed inlets,
 wherein the slot cavity has a cross-sectional area that decreases along a generally axial direction, and wherein the first feed inlet is positioned at a first depth from the slot bottom wall to the first feed inlet, and the second feed inlet is positioned at a second depth from the slot bottom wall to the second feed inlet, and wherein the first depth is greater than the second depth, and
 wherein the base surface includes at least one convex segment in between the first and second feed inlets.

12. The turbine rotor assembly of claim 11, wherein the base surface has a forward end and an aft end, and wherein the attachment portion has a first radial length between the platform and the forward end of the base surface and a second radial length between the platform and the aft end of the base surface, the second radial length being greater that the first radial length.

13. The turbine rotor assembly of claim 11, wherein the feed inlets are scooped.

* * * * *